(12) United States Patent
Lin et al.

(10) Patent No.: US 7,346,540 B2
(45) Date of Patent: Mar. 18, 2008

(54) MARKETING SELECTION OPTIMIZATION PROCESS

(75) Inventors: Yinghua Lin, Los Alamos, NM (US); Stephen Coggeshall, Los Alamos, NM (US)

(73) Assignee: Fair Isaac Corporation, San Diego, CA (US)

(*) Notice: Subject to any disclaimer, the term of this patent is extended or adjusted under 35 U.S.C. 154(b) by 141 days.

(21) Appl. No.: 11/456,534

(22) Filed: Jul. 10, 2006

(65) Prior Publication Data
US 2007/0005415 A1   Jan. 4, 2007

Related U.S. Application Data

(63) Continuation of application No. 11/036,649, filed on Jan. 14, 2005, now Pat. No. 7,076,442, which is a continuation of application No. 09/546,949, filed on Apr. 11, 2000, now Pat. No. 6,847,934.

(51) Int. Cl.
   *G06F 17/60* (2006.01)
(52) U.S. Cl. ............... 705/10; 705/26; 705/28; 705/29; 705/35
(58) Field of Classification Search ............ 705/10
   See application file for complete search history.

(56) References Cited

U.S. PATENT DOCUMENTS 4,355,372 A * 10/1982 Johnson et al. .......... 379/92.04
5,966,695 A * 10/1999 Melchione et al. .......... 705/10
6,158,657 A * 12/2000 Hall et al. ................ 235/380
6,223,163 B1 * 4/2001 Van Luchene ............. 705/1
6,366,890 B1 * 4/2002 Usrey ...................... 705/10

FOREIGN PATENT DOCUMENTS

WO    WO 9715023 A2 *  4/1997

* cited by examiner

*Primary Examiner*—Romain Jeanty
(74) *Attorney, Agent, or Firm*—Michael A. Glenn; Glenn Patent Group (57) ABSTRACT

A market selection optimization method comprising the steps of assigning product offers to consumers in the presence of multiple constraints, such that each consumer is assigned at least one product offer; determining a difference in expected profitability associated with the assigned product offer and a different product offer for each consumer; sorting the consumers according to the respective difference in expected profitabilities associated with the product offers; and reassigning the product offers to the sorted consumers in accordance with the respective difference in expected profitabilites. The result of this process is a selection of marketing offers that optimizes expected revenues.

6 Claims, 8 Drawing Sheets

Example: 5 customer 2 product

Profitability table

|    | P1 | P2 |
|----|----|----|
| C1 | 10 | 20 |
| C2 | 15 | 14 |
| C3 | 14 | 18 |
| C4 | 16 | 21 |
| C5 | 17 | 23 |

Marketing request:
    P1 needs to be marketed for 3 customers and P2 needs to be marketed for 2 customers.

Step 1: randomly initialize the lists
    C1, C2, and C3 in P1 list
    C4 and C5 in P2 list The total profit for this assignment is (10+15+14) + (21+23) = 83

Step 2: calculate (P1-P2)

|    | P1 | P2 | P1-P2 |
|----|----|----|-------|
| C1 | 10 | 20 | -10   |
| C2 | 15 | 14 | 1     |
| C3 | 14 | 18 | -4    |
| C4 | 16 | 21 | -5    |
| C5 | 17 | 23 | -6    |

Step 3: sort the list by (P1-P2)

|    | P1 | P2 | P1-P2 |
|----|----|----|-------|
| C2 | 15 | 14 | 1     |
| C3 | 14 | 18 | -4    |
| C4 | 16 | 21 | -5    |
| C5 | 17 | 23 | -6    |
| C1 | 10 | 20 | -10   |

Step 4: assign C2, C3, and C4 for P1 and C5 and C1 for P2

The total profit for the last assignment is (15+14+16) + (23+20) = 88

FIG. 4

Example: 6 customer 3 product
Profitability table

|    | P1 | P2 | P3 |
|----|----|----|----|
| C1 | 10 | 20 | 15 |
| C2 | 15 | 14 | 16 |
| C3 | 14 | 18 | 17 |
| C4 | 16 | 21 | 18 |
| C5 | 17 | 23 | 19 |
| C6 | 16 | 19 | 20 |

Marketing request:
    Each of the 3 products needs to be marketed for 2 customers.

Step 1: randomly initialize the lists
    C1 and C2 in P1 list
    C3 and C4 in P2 list
    C5 and C6 in P2 list The total profit for this assignment is (10+15) + (18+21) + (19+20) = 103

Step 2: for the customers in P1 and P2 lists calculate (P1-P2)

|    | P1 | P2 | P3 | P1-P2 |
|----|----|----|----|-------|
| C1 | 10 | 20 | 15 | -10   |
| C2 | 15 | 14 | 16 | 1     |
| C3 | 14 | 18 | 17 | -4    |
| C4 | 16 | 21 | 18 | -5    |

Step 3: sort the customers in P1 and P2 lists by (P1-P2)

|    | P1 | P2 | P3 | P1-P2 |
|----|----|----|----|-------|
| C2 | 15 | 14 | 16 | 1     |
| C3 | 14 | 18 | 17 | -4    |
| C4 | 16 | 21 | 18 | -5    |
| C1 | 10 | 20 | 15 | -10   |

Step 4: change in P1 and P2 lists according to the sorted list from the previous step     C2 and C3 in P1 list
    C4 and C1 in P2 list Step 5: for the customers in P1 and P3 lists calculate (P1-P3)

|    | P1 | P2 | P3 | P1-P3 |
|----|----|----|----|-------|
| C2 | 15 | 14 | 16 | -1    |
| C3 | 14 | 18 | 17 | -3    |
| C5 | 17 | 23 | 19 | -2    |
| C6 | 16 | 19 | 20 | -4    |

FIG. 5

Step 6: sort the customers in P1 and P3 lists by (P1-P3)

|    | P1 | P2 | P3 | P1-P3 |
|----|----|----|----|-------|
| C2 | 15 | 14 | 16 | -1    |
| C5 | 17 | 23 | 19 | -2    |
| C3 | 14 | 18 | 17 | -3    |
| C6 | 16 | 19 | 20 | -4    |

Step 7: change in P1 and P3 lists according to the sorted list from the previous step     C2 and C5 in P1 list
    C3 and C6 in P3 list Step 8: for the customers in P2 and P3 lists calculate (P2-P3)

|    | P1 | P2 | P3 | P2-P3 |
|----|----|----|----|-------|
| C1 | 10 | 20 | 15 | 5     |
| C3 | 14 | 18 | 17 | 1     |
| C4 | 16 | 21 | 18 | 3     |
| C6 | 16 | 19 | 20 | -1    |

Step 9: sort the customers in P2 and P3 lists by (P2-P3)

|    | P1 | P2 | P3 | P2-P3 |
|----|----|----|----|-------|
| C1 | 10 | 20 | 15 | 5     |
| C4 | 16 | 21 | 18 | 3     |
| C3 | 14 | 18 | 17 | 1     |
| C6 | 16 | 19 | 20 | -1    |

Step 10: change the P2 and P3 lists according to the sorted list from the previous step     C1 and C4 in P2 list
    C3 and C6 in P3 list
(Note the lists are not updated in the last step)

Repeat step 2 to step 10 for two or more times for complicated problems.

The final lists of this example are
    C2 and C5 in P1 list
    C1 and C4 in P2 list
    C3 and C6 in P3 list
The total profit is (15+17) + (20+21) + (17+20) = 110

|  | A | B |
|---|---|---|
| Customer 1 | *57* | 16 |
| Customer 2 | 13 | *35* |
| Customer 3 | *32* | 29 |
| Customer 4 | 26 | *8* |

Total Profit :  57 + 35 + 32 + 8 = 132

FIG. 7A
(PRIOR ART)

|  | A | B |
|---|---|---|
| Customer 1 | *57* | 16 |
| Customer 2 | 13 | *35* |
| Customer 3 | 32 | *29* |
| Customer 4 | *26* | 8 |

Total Profit :  57 + 35 + 29 + 26 = 147 (about 10% higher)

Verus

Total Profit :  57 + 35 + 32 + 8 = 132  (Fig. 7A)

FIG. 7B

MARKETING SELECTION OPTIMIZATION PROCESS

CROSS-REFERENCE TO RELATED APPLICATION

This application is a continuation of application Ser. No. 11/036,649, entitled "Marketing Selection Optimization Process" filed Jan. 14, 2005, which is a continuation of U.S. Pat. No. 6,847,934, entitled "Marketing Selection Optimization Process," granted on Jan. 25, 2005, which application is incorporated herein in its entirety by the reference thereto.

FIELD OF THE INVENTION

The present invention relates to a marketing selection optimization process for the marketing of goods or other services to consumers. More specifically, the present invention relates to a marketing selection process for optimizing profits per offer in the marketing of goods or other services to consumers.

BACKGROUND

Increasingly, in the current competitive business climate, there is a profit driven motive to maximize the profitability of goods and services that are provided or marketed to potential or existing customers. The marketing pool for a product that is marketed to customers, who may accept the product, can be very large, such as on the order of tens of millions of customers. As such, the ability to market a specific product or service to a particular customer(s) from a portfolio of possible offers, in order to maximize the profit obtained for that portfolio of products or services, becomes increasingly complex and time consuming as the numbers of products and customers increase.

Using a profit model for a particular product, provided the product is the only possible product for marketing, it is relatively easy to identify the most profitable customers by using the profit model to rank-order candidates by the predicted profit associated with each particular customer and associated product.

While the marketing problem of maximizing the total profit of one product is relatively easy, maximizing the total profit of multiple product offerings to multiple customers becomes increasingly complex. Accordingly, when multiple products are marketed simultaneously, maximizing the marketing profit of each product on an individual basis (e, g., one by one) will generally not maximize the total portfolio marketing profit.

Figure 7A:
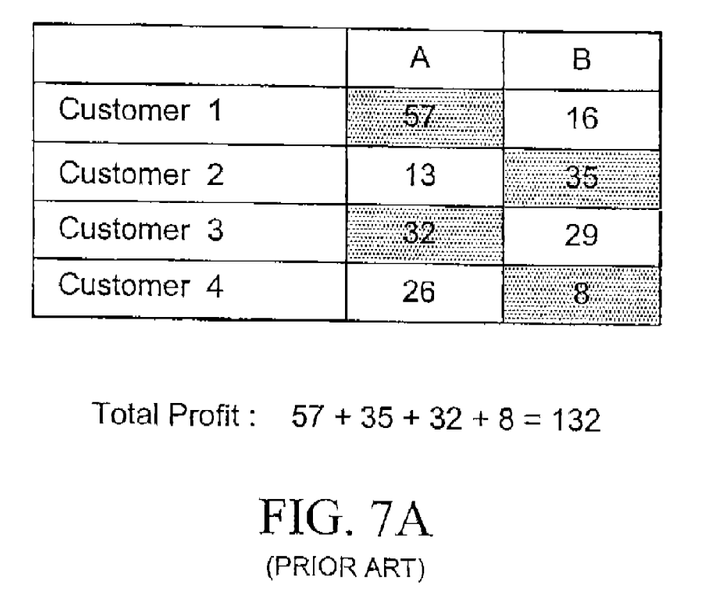
FIG. 7A (labeled prior art) illustrates an example of the currently employed techniques that are employed for customer/product profit optimization.
Figure 7B:
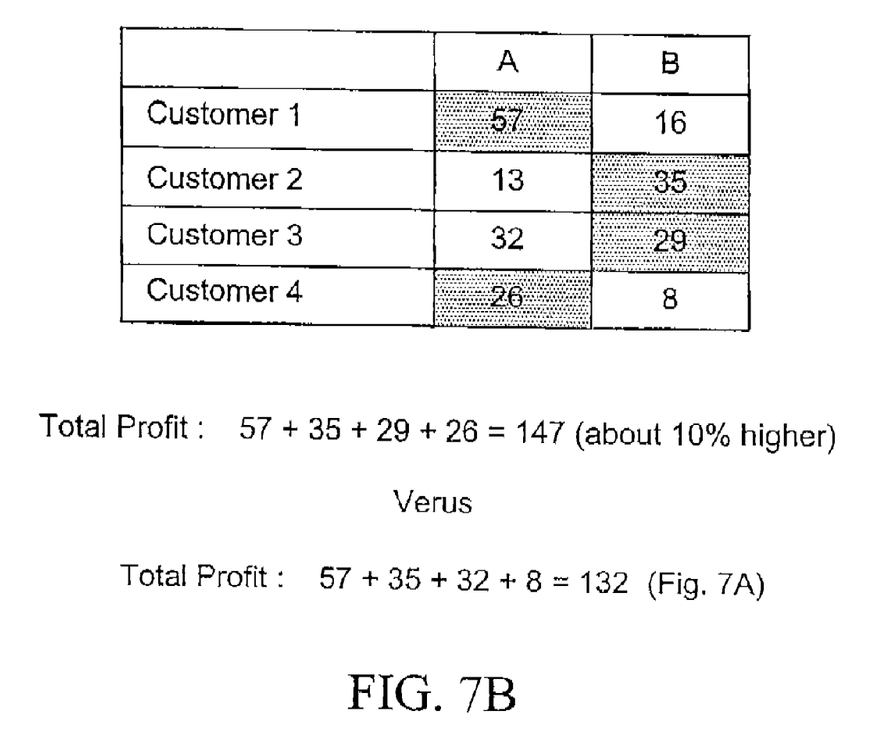
FIG. 7B illustrates an example of the inefficiency of the currently employed techniques that are employed for customer/product profit optimization.

For instance, FIGS. 7A and 7B illustrate a simple example of the aforementioned problem when multiple products are marketed simultaneously, wherein maximizing the marketing profit of each product on an individual basis (e.g., one by one) will generally not maximize the total portfolio marketing profit.

FIG. 7A illustrates the situation where two different products (ergs, products A and B) are marketed to four different consumers or customers (e.g., customers 1-4), wherein (1) each customer is to receive only one product offer, and (2) two of each product is offered or sold to the customers. As illustrated in FIG. 7A, the maximum profit extracted from customer 1 is with product A (57); the maximum profit extracted from customer 2 is with product B(35); the maximum profit extracted from customer 3 is with product A(32); and the maximum profit extracted from customer 4 is with product B (8), as two of each product must be offered or sold to the customers. As such, in FIG. 7A, the total maximum profit achieved in this example is: 57+35+32+8=132.

FIG. 7B illustrates an example, which the present invention is directed to, where the two different products (e.g., products A and B), from FIG. 7A, are marketed to four different consumers or customers (e.g., customers 1-4), wherein (1) each customer is to receive one product, and (2) two of each product is offered or sold to the customers. As illustrated in FIG. 7B, the maximum profit extracted from customer 1 is with product A (57); the maximum profit extracted from customer 2 is with product B (35); the maximum profit extracted from customer 3 is with product A (29), instead of product B (32); and the maximum profit extracted from customer 4 is with product B (26), this combination of products and customers satisfies the requirements of having two of each product being offered or sold to the customers. As such, as illustrated in FIG. 7B, the total maximum profit achieved in this example is: 57+35+29+26=147, which is about a 10% higher profit than total maximum profit of example of FIG. 7A.

As illustrated by the above example in FIG. 7A, the maximum profit determined from the process of maximizing the marketing profit of each product on an individual basis (e.g., one by one) generally does not maximize the total marketing profit. Rather, in support of this assertion, as clearly illustrated by the example of FIG. 7B, it is possible to maximize the total marketing profit using a technique other than the process commonly used in maximizing the marketing profit of each product on an individual basis (e.g., one by one), which generally does not maximize the total marketing profit, as illustrated in the comparison of total profits of the examples of FIG. 7A and FIG. 7B.

Moreover, the ability to maximize profits with operations involving selling multiple products to multiple customers under the objective of maximizing the total profit to the client (e.g., financial institution) is further complicated by such considerations and constraints as individual customer restrictions, policy, and/or product restrictions.

For instance, some operations necessitate consideration of such restrictions as individual customer restrictions, marketing resource restrictions, and marketing policy restrictions, which may need to be considered in or during the operational process.

In order to be a viable operation with the ability to maximize profits with operations involving selling multiple products to multiple customers under the objective of maximizing the total profit to the client (financial institution), the operation must generally contend with: (1) the complex mathematical/statistical problem of maximizing the total profit of multiple product offerings offered to multiple clients, which becomes increasingly complex with the addition of more products and clients; and (2) the problem of incorporating consideration restrictions such as individual customer restrictions, marketing resource restrictions, and marketing policy restrictions, which may need to be included in the operational process.

Currently, there are a variety of different techniques used by individuals and businesses, which attempt to maximize profits in situations involving multiple product offerings offered to multiple clients. Presently, the various techniques employed to maximize profits, however, generally fail to actually maximize overall profits, which results in unnecessary lost profits to the client (egg., financial institution), It is therefore desirable to provide a technique that provides clients with the ability to effectively maximize profits in operations involving selling multiple products to multiple customers under the objective of maximizing the total profit to the client offering the products to customers.

SUMMARY OF THE INVENTION

Embodiments of the present invention provide for a market selection optimization method and computer medium.

In one embodiment, the market selection optimization method generally comprises the steps of assigning product offers to consumers such that each consumer is assigned at least one product offer; determining a difference in expected profitabilty associated with the assigned at least one product offer and a different product offer for each consumer; sorting the consumers according to the respective difference in expected profitabilities associated with the product offers; and reassigning the product offers to the sorted consumers in accordance with the respective difference in expected profitabilities.

In an alternate embodiment, the market selection optimization method comprises the steps of assigning product offers to consumers such that each consumer is assigned at least one product offer from a combination of two product offers, wherein a first product offer is made to a first group of consumers and a second product offer is made to a second group of consumers resulting in an assignment pattern; determining a difference in expected profitabilty associated with the assigned product offers for each consumer; sorting the consumers according to the respective difference in expected profitabilities; and reassigning the product offers to the sorted consumers in accordance with the assignment pattern.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In one embodiment, the steps of the present invention are embodied in machine-executable instructions, such as computer instructions. The instructions can be used to cause a general-purpose or special-purpose processor that is programmed with the instructions to perform the steps of the present invention.

Alternatively, the steps of the present invention might be performed by specific hardware components that contain hardwired logic for performing the steps, or by any combination of programmed computer components and custom hardware components.

Computer Environment

Figure 1:
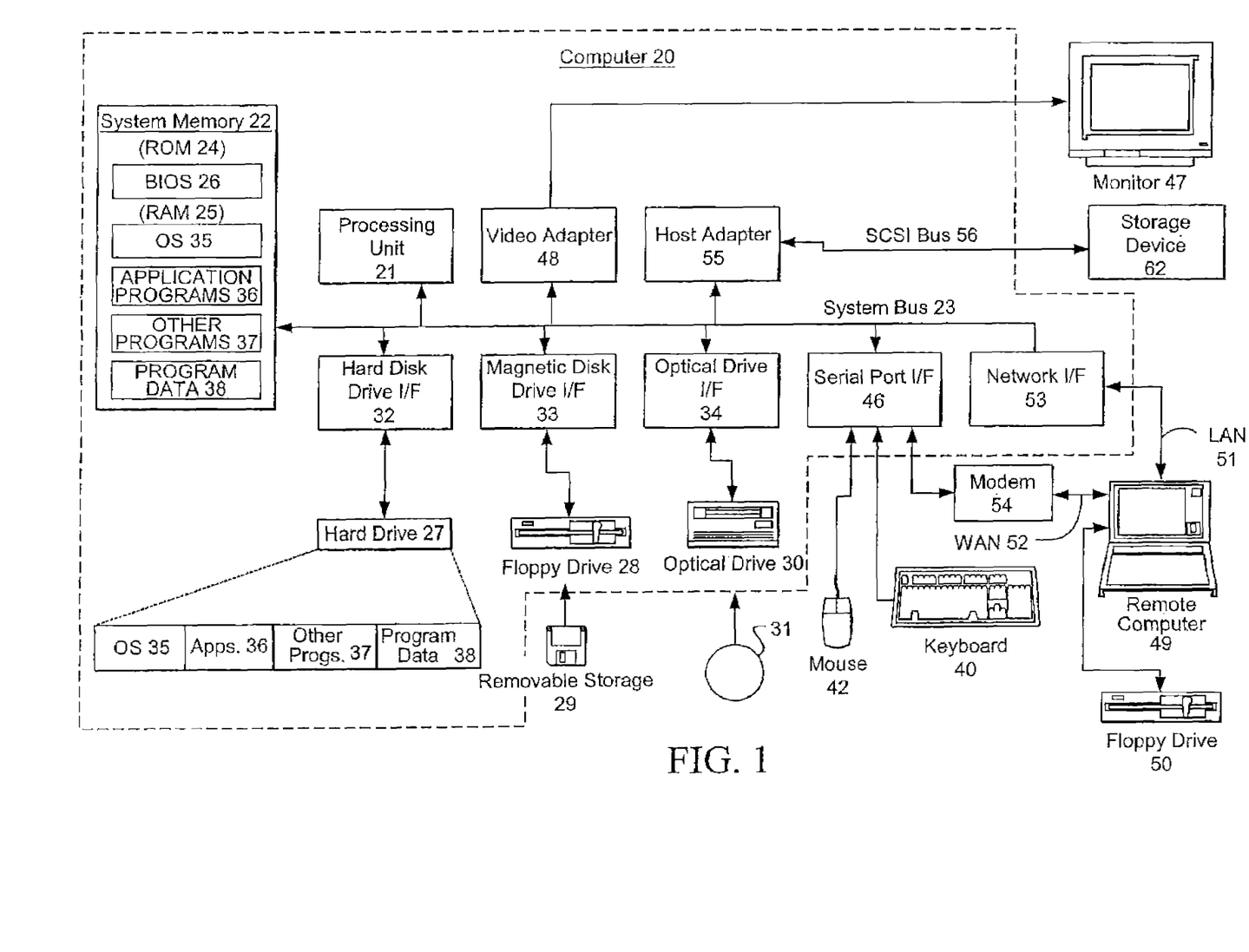
FIG. 1 illustrates an embodiment of a computing environment in which the invention may be implemented in accordance with the teachings of one embodiment of the present invention.

FIG. 1 and the following description are intended to provide a general description of a suitable computing environment in which the invention may be implemented. Although not necessarily required, the invention will be described in the general context of computer-executable instructions, such as program modules, being executed by a computer, such as a client workstation or a server.

Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system may include a conventional personal computer 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 may include read-only memory (ROM) 24 and random access memory (RAM) 25. A basic input/output system 26 (BIOS), containing the basic routines that help to transfer information between elements within the personal computer 20, such as during start-up, may be stored in ROM 24. The personal computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 may be connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20.

Although the exemplary embodiment described herein may employ a hard disk, a removable magnetic disk 29, and a removable optical disk 31, or combination thereof, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk31, ROM 24 or RAM 25, including an operating system35, one or more application programs36, other program modules 37 and program data38. A user may enter commands and information into the personal computer 20 through input devices such as a keyboard 40 and pointing device 42. Other input devices (not shown) may include a microphone, joystick, game e pad, satellite disk, scanner, or the like. These and other input devices are often connected to the processing unit 21 through a serial port interface 46 that is coupled to the system bus 23, but may be connected by other interfaces, such as a parallel port, game port, or universal serial bus (USB). A monitor 47 or other type of display device may also be connected to the system bus 23 via an interface, such as a video adapter 48. In addition to the monitor 47, personal computers may typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Network Environment

Figure 2:
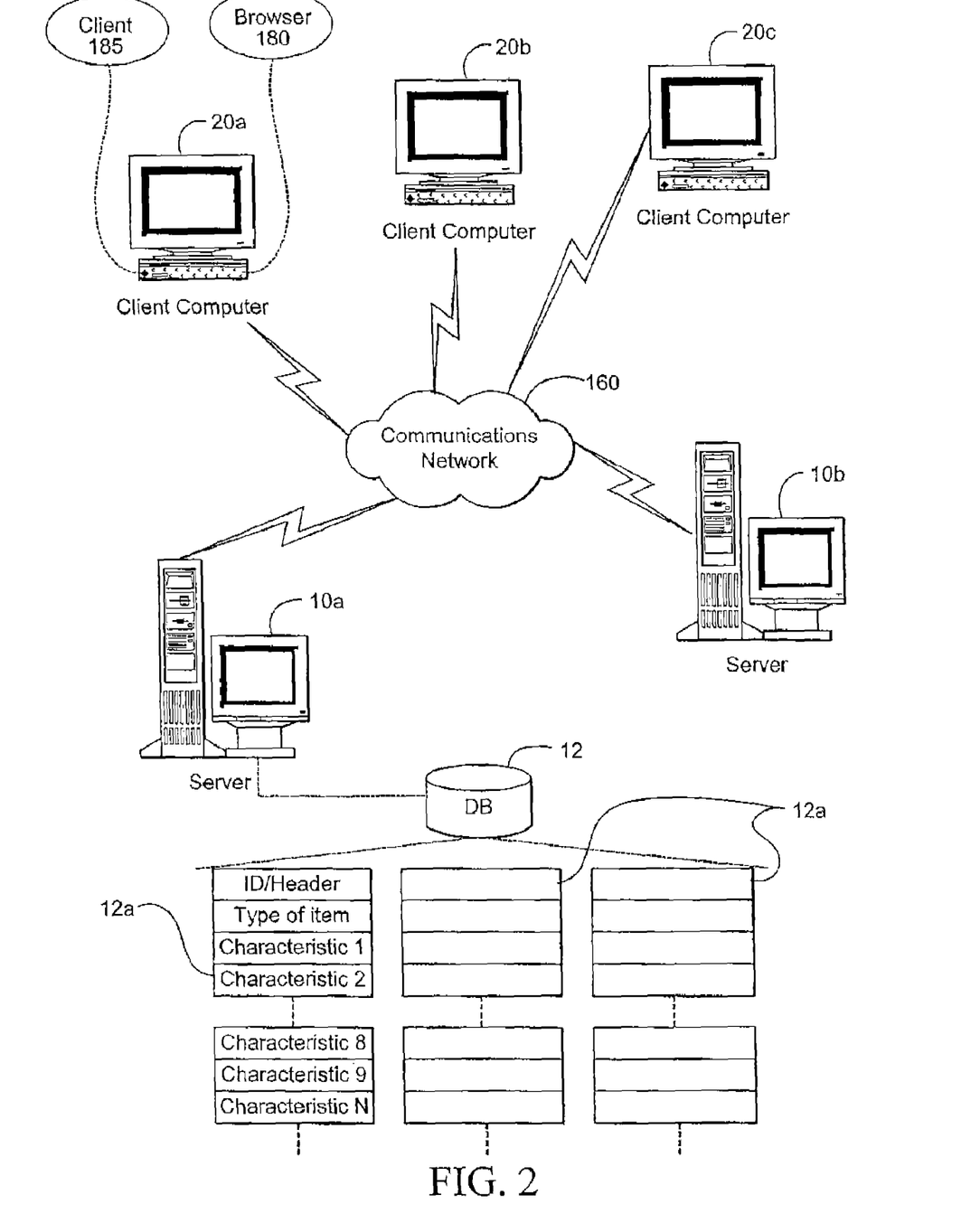
FIG. 2 illustrates an embodiment of an exemplary network environment in which the present invention may be employed in accordance with the teachings of one embodiment of the present invention.

As noted, the general-purpose computer described above can be deployed as part of a computer network. In general, the above description applies to both server computers and client computers deployed in a network environment. FIG. 2 illustrates one such exemplary network environment in which the present invention may be employed. As shown in FIG. 2, a number of servers10a, 10b, etc., are interconnected via a communications network 160 (which may be a LAN, WAN, Intranet or the Internet) with a number of client computers 20a, 20b, 20c, etc. In a network environment in which the communications network 160 is, e.g., the Internet, the servers 10 can be Web servers with which the clients 20 communicate via any of a number of known protocols such as, for instance, hypertext transfer protocol (HTTP). Each client computer 20 can be equipped with a browser 180 to gain access to the servers 10, and client application software 185. As shown in the embodiment of FIG. 2, server 10a includes or is coupled to a dynamic database 12.

As shown, the database 12 may include database fields 12a, which contain information about items stored in the database 12. For instance, the database fields 12a can be structured in the database in a variety of ways. The fields 12a could be structured using linked lists, multi-dimensional data arrays, hash tables, or the like, This is generally a design choice based on ease of implementation, amount of free memory, the characteristics of the data to be stored, whether the database is likely to be written to frequently or instead is likely to be mostly read from, and the like. A generic field 12a is depicted on the left side. As shown, a field generally has sub-fields that contain various types of information associated with the field, such as an ID or header sub-field, type of item sub-field, sub-fields containing characteristics, and so on. These database fields 12a are shown for illustrative purposes only, and as mentioned, the particular implementation of data storage in a database can vary widely according to preference.

Thus, the present invention can be utilized in a computer network environment having client computers for accessing and interacting with the network and a server computer for interacting with client computers and communicating with a database with stored inventory fields. Likewise, the marketing selection optimization process of the present invention can be implemented with a variety of network-based architectures, and thus should not be limited to the examples shown. The present invention will now be described in more detail with reference to preferred embodiments.

Market Selection Optimization Process

The present invention is directed to a method or process wherein a singular or series of items, products, actions, or services are offered to a series of customers, wherein the objective is to maximize the total profit ($P_T$) derived from the product offerings to the customers. The term product or product offer may refer to a specific product, product offer, service, action, or a change associated with the same, but is not limited to such. Likewise, the term consumer or customer may refer to an individual, household, an account, a group, organization, institution, or other entity, but is not limited to such.

Although one embodiment of the present invention, as embodied in the appended claims, is described in terms of a product/consumer relationship example, it is understood that the concepts of the present invention may be applied to a variety of different scenarios. As such, the concepts of the present invention may be applied in a variety of different scenarios wherein an optimization process is to be applied to a data set.

Figure 3:
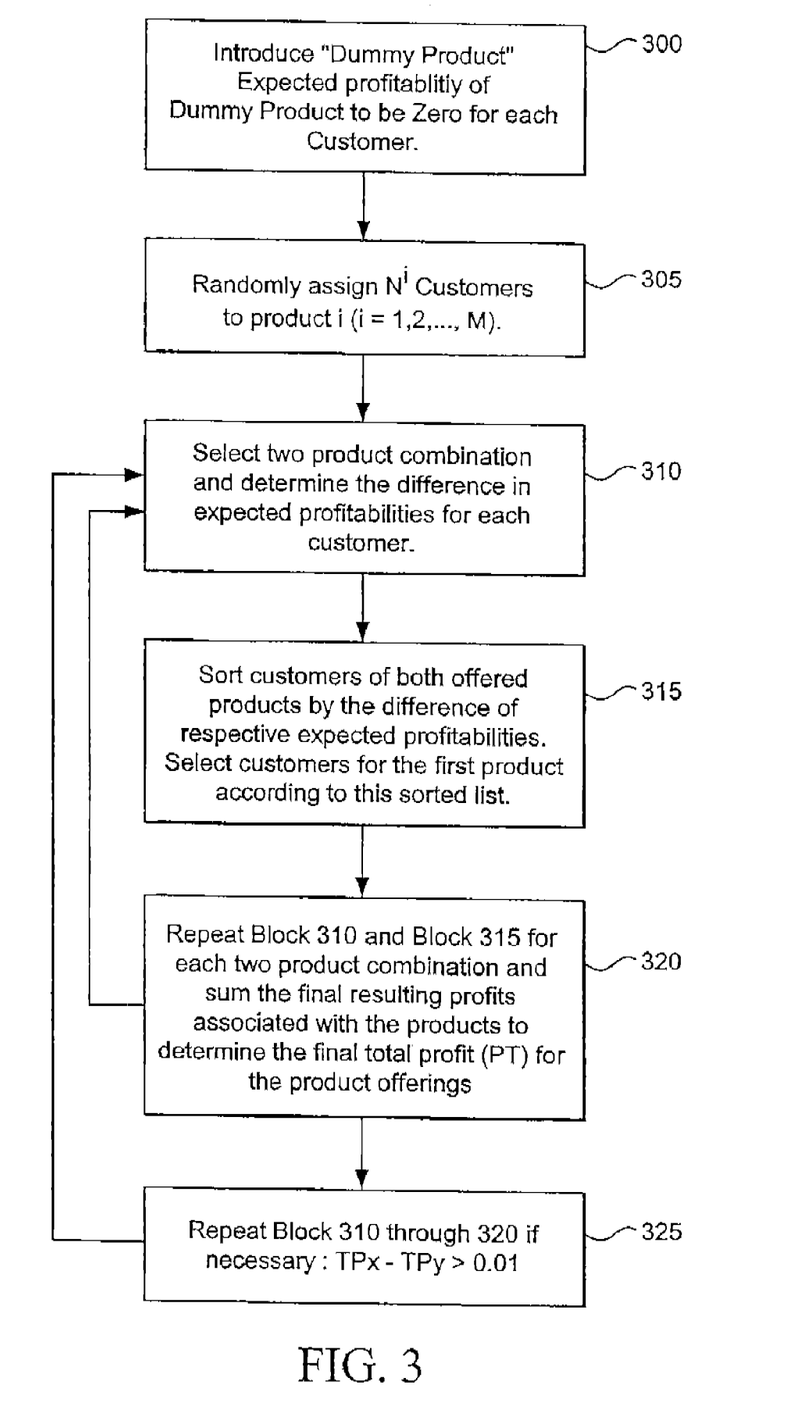
FIG. 3 illustrates an embodiment of a method capable of implementing the teachings of the present invention, in flow-chart diagram format, in accordance with the teachings of one embodiment of the present invention.

FIG. 3 illustrates an embodiment of a method capable of implementing the teachings of the present invention, in flow-chart diagram format. Although the present invention will be described in terms of specific examples, it is understood that the inventive concepts, as embodied in the appended claims, may be applied to wide variety of data processing scenarios and a wide variety of different data types.

Initially, in one embodiment, assume there are N candidate customers in the market and suppose we have M products for marketing. Each separate product will be marketed to $N^i$ {i=1, 2, ..., M} customers from the N candidates.

Likewise, suppose we have built M profitability models, one for each of the M products. The predicted profit for marketing product i to customer j is denoted by p (i, j). In one embodiment, we are restricted in that each customer can only be marketed one product at one time. As such, the objective is to maximize the total profit(PT) derived from offering the products to the customers, The mathematical representation of the marketing problem scenario to be addressed by the present method may be illustrated as follows:

$$P_T = \sum_{j=1}^{N} \sum_{i=1}^{M} a(i, j) \times p(i, j) \qquad (1)$$

$$a(i, j) = \{0, 1\} \quad i = 1, 2, \ldots, M; \quad j = 1, 2, \ldots, N$$

$$\sum_{i=1}^{M} a(i, j) = 1 \quad j = 1, 2, \ldots, N$$

$$\sum_{j=1}^{N} a(i, j) = N^i \quad i = 1, 2, \ldots, M$$

$$\sum_{i=1}^{M} N^i \leq N$$

In the above marketing problem, a(i, j), being either zero or one, indicates whether products i is marketed to candidate j.

The set of equations(1) employed by one embodiment of the present invention is a type of linear integral programming problem and it belongs to a class of mathematical problems called "NP-hard", or "non-deterministic in polynomial time". When N is over a million, it is generally nearly impossible to exhaustively solve the problem for the global maximum profit using today's machines and techniques.

In the present invention, at Block 300, a dummy product is initially introduced into the equation (1), wherein the profit for the dummy product will result in a zero (0) value for all marketing candidates. Accordingly, the dummy product will be marketed to $$\left(N - \sum_{i=1}^{M} N^i\right)$$

customers, and as such the "less that and equal" sign in the last line of equation (1) is transformed into an equal sign.

Initially, the solution to a special case of the marketing profit maximization is illustrated: the marketing of two products, such that the M in the above equations is equal to 2. To make the problem even simpler, we suppose every candidate will be offered a product. Equation (1) then becomes:

$$P_T = \sum_{j=1}^{N} \sum_{i=1}^{2} a(i, j) \times p(i, j)$$

$$a(i, j) = \{0, 1\} \quad i = 1, 2; \quad j = 1, 2, \ldots, N$$

$$a(1, j) + a(2, j) = 1 \quad j = 1, 2, \ldots, N$$

$$\sum_{j=1}^{N} a(i, j) = N^i \quad i = 1, 2$$

$$N^1 + N^2 = N$$

Accordingly, the general solution to the above problem, commonly referred to as a two product complete marketing algorithm, is:
(1) Sort all the candidate according to p (1, j)–p (2, j) in decreasing order (2) Choose $N^1$ customers from the top of the sorted list for product 1
(3) The rest of the customers are for product 2

As such, the two product complete marketing algorithm is intended to produce the global maximum marketing profit. The proof may be illustrated by the following example, wherein when a change is made to any customer (a) from the list of product 1 with a customer (b) from the list of product 2, the profit difference will be $$\Delta p = (p(2, a) + p(1, b)) - (p(1, a) + p(2, b))$$
$$= (p(2, a) - p(2, b)) - (p(1, a) + p(1, b))$$

Since customer (a) is above customer (b) on the sorted list, we have p(1, a)-p(1, b)≧p(2, a)-p(2, b)

So,

Δp≦0.

Accordingly, the total profit will be reduced when we switch any one customer in the list of product 1 with any one customer in the list of product 2. Therefore, the total profit generated by the two product complete marketing algorithm is maximized.

For many practical "real world" problems, the number of products is generally two or more. In the above example, we describe an algorithm that uses the "two product complete marketing" process to address this multiple product problem. Accordingly, in one embodiment, when more than two products need to be marketed, we consider two products at each time to generate the global maximum profit of the two products, which is a local maximum for the entire optimization. Initially, we can assign the candidates to products randomly, although this can easily be improved. We then iterate through all combinations of two products to increase the total profit, this iteration process can be continued while monitoring the total profit until the desired asymptotic approach to the global maximum is attained.

Referring to back to FIG. 3, as mentioned above, at Block 300 a dummy product is introduced. The expected profitability of the dummy product will be zero (0) for all customers. The number of customers for the dummy product will be the difference of the total customers and the total marketed customers for all products.

At Block 305, in one embodiment, a random assignment is made of the $N^i$ customers to product $i\{i=1, 2, \ldots, M\}$. Alternately, a 'greedy' algorithm may be invoked to assign the N customers to the M products. As such, the process is initialized by assigning at least one particular product or product offer to each customer. As mentioned, this can be done randomly or through the use of any other available algorithm. In one embodiment, the single product models are used to initialize the process by assigning the top decile consumers to that product for each model, removing multiple entries, and continuing through the lower deciles until each customer has an assignment. The complete process is generally insensitive to the initialization process.

Next, at Block 310, any two products (e.g., $i\{i=1, 2, \ldots, M\}$ and $j\{j\neq i; j=1, 2, \ldots, M\}$) from the offered products list are chosen (e.g., the assigned product and another product), whereupon the respective expected profitabilities associated with each product offer for each consumer is determined.

Accordingly, at Block 315, the list of customers of both offered products is sorted by the difference in these respective expected profitabilities (DEP). In one embodiment, the consumers or candidates $k\{k=1, 2, \ldots, (N^i+N^j)\}$ are sorted according to $p(i, k)-p(j, k)$, which is the difference in respective expected profitabilities, in decreasing order. Accordingly, $N^i$ customers are chosen from the top of the sorted list for product i and the remaining customers are chosen for product j. In an alternate embodiment, the consumers or candidates $k\{k=1, 2, \ldots, (N^i+N^j)\}$ are sorted according to $p(i, k)-p(j, k)$, which is the difference in respective expected profitabilities, in increasing order. Accordingly, in one selected embodiment, $N^i$ customers are chosen from the bottom of the sorted list for product i and the remaining customers are chosen for product j. It is understood that in some instances, a customer product offer for a particular customer may be exchanged when the overall profitability can be increased by the exchange.

At Block 320, repeat Block 310 and Block 315 for each two-product combination to increase the overall profitability. In one embodiment, during the instance of Block 320, the first profit associated with a particular product is overwritten by subsequent profit amounts associated with that same product when determining the final profit amount for that product. In an alternate embodiment, the different profits associated with each corresponding product may simply be compared to each other to determine the maximum profit for that particular product. The operation of Block 320 will be illustrated in further detail by example in the following description.

At Block 320, the final resulting profits associated with the respective products are summed to provide a final total profit ($P_T$) for the different products (P1, P2, ..., Px), which are being offered to the different customers (C1, C2, ..., Cx). As such, the final total profit ($P_T$) may be expressed as $P_T$=Final Profit[P1]+Final Profit[P2]+ ... +Final Profit[Px].

At Block 325, repeat Block 310 through Block 320, if necessary. In one embodiment, it is typically sufficient to repeat Block 310 through Block 320 three times for optimization purposes. In an alternate embodiment, the expression (TPx−TPy)/TPx>0.01, wherein TPx and TPy represent respective total profits obtained at different stages of the process, is used to determine whether to repeat Block 310 through Block 320. Likewise, the operation of Block 325 will be illustrated by example in the following description.

Figure 4:
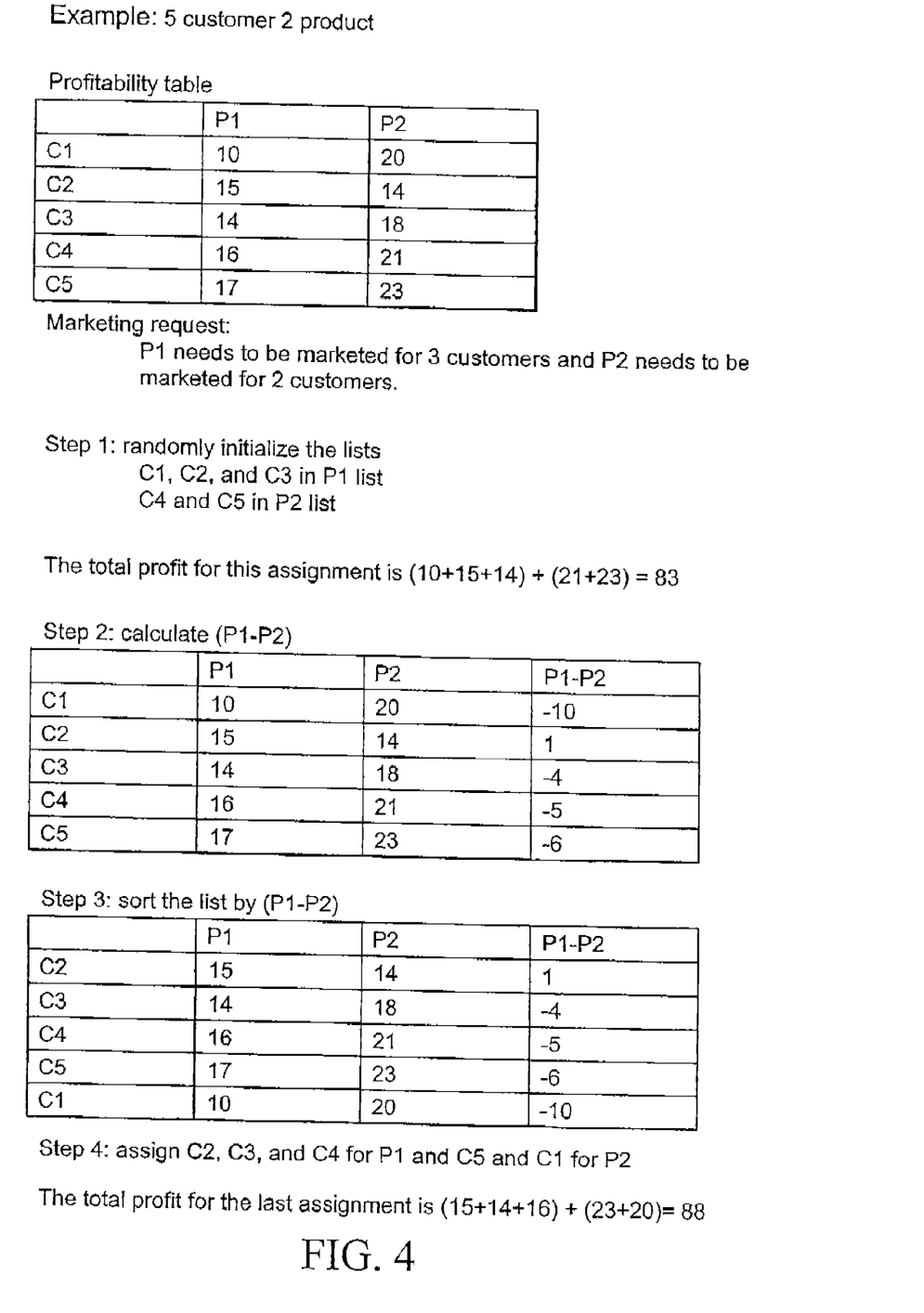
FIG. 4 illustrates an embodiment of an example of the optimization process in accordance with the teachings of one embodiment of the present invention.

FIG. 4 illustrates one embodiment of a practical operational example of the optimization process described above. As illustrated in FIG. 4, two different products (P1 and P2) are being offered to five different customers (C1, C2, C3, C4 and C5) with the goal of maximizing the overall final total profit ($P_T$) for the particular product offering of products P1 and P2. In the embodiment of FIG. 4, P1 is offered to three of the five customers and P2 is offered to the remaining two customers.

As such, in accordance with Block 305, a random assignment is made of the $N^i$ customers to product $i\{i=1, 2, \ldots, M\}$. Alternately, a 'greedy' algorithm may be invoked to assign the N customers to the M products. Accordingly, the process is initialized by assigning one particular product or product offer to each customer. As mentioned earlier, this can be done randomly or through the use of any other available algorithm.

Therefore, as illustrated in Step 1 in FIG. 4, a random assignment of the products P1 and P2 is made, wherein product 1 (P1) is chosen to be marketed to three customers of the five customers, and product 2 (P2) is chosen to be marketed to the two remaining customers from the overall total of five customers. Accordingly, using a random assignment, product P1 is assigned to customers C1, C2, and C3 and product P2 is assigned to C4 and C5. As a result, the total profit for this random assignment is (10+15+14)+(21+23)=83.

Next, in accordance with Block 310, any two products (e.g., $i\{i=1, 2, \ldots, M\}$ and $j\{j\neq i; j=1, 2, \ldots, M\}$) from the offered products list are chosen, whereupon the respective expected profitabilities for each consumer is determined.

Accordingly, in the example of FIG. 4, only a total of two products (P1 and P2) are being offered to the customers C1 through C5. As such, the expected profitabilities for each customer is determined by using the only two products that are being offered, illustrated as Step 2 in FIG. 4. As such, the expected profitability difference (P1−P2) for each consumer is as follows: C1=P1−P2=10−20=−10 C2=P1−P2=15−14=1; C3=P1−P2=14−18=−4; C4=P1−P2=16−21=−5; and C5=P1−P2=17−23=−6.

In accordance with Block 315, the list of customers of both offered products are sorted by the difference in their respective expected profitabilities. In one embodiment, the consumers or candidates $k\{k=1, 2, \ldots, (N^i+N^j)\}$ are sorted according to $p(i, k)-p(j, k)$, which is the difference in respective expected profitabilities, in decreasing order. Accordingly, $N^i$ customers are chosen from the top of the sorted list for product i and the remaining customers are chosen for product j. In an alternate embodiment, the consumers or candidates $k\{k=1, 2, \ldots, (N^i+N^j)\}$ are sorted according to $p(i, k)-p(j, k)$, which is the difference in respective expected profitabilities, in increasing order. Accordingly, $N^i$ customers are chosen from the bottom of the sorted list for product i and the remaining customers are chosen for product j. It is understood that in some instances, a customer product offer for a particular customer may be exchanged when the overall profitability can be increased by the exchange.

Accordingly, the list of customers of both offered products is sorted by the difference in these respective expected profitabilities (DEP), illustrated as Step 3 in FIG. 4. Therefore, C2 is first on the list with an DEP of 1, followed by C3 with an DEP of −4, followed by C4 with an DEP of −5, followed by C5 with an DEP of −6, and finally C1 with an DEP of −10.

Referring back to the random assignment above, product P1 was randomly assigned to customers C1, C2, and C3 and product P2 was randomly assigned to C4 and C5. As such, product P1 was randomly assigned to three customers and product P2 was randomly assigned to two customers. In accordance with the original random assignment, the first three customers (e.g., C2, C3, and C4) from the sorted list are assigned to the product P1 and the last two customers (e.g., C5 and C1) are assigned to the product P2. As a result, the final total profit ($P_T$) for this new assignment is (15+14+16)+(23+20)=88, as opposed to the total profit for the initial random assignment, which yielded a total profit of (10+15+14)+(21+23)=83. As such, by employing the above illustrated optimization method, an additional profit of approximately 9.4% was realized.

In the example of FIG. 4, Block 320 and Block 325 are omitted as there are only a total of two different products being offered, and as such, in the example of FIG. 4, Block 320 and Block 325 are generally unnecessary.

Figure 5:
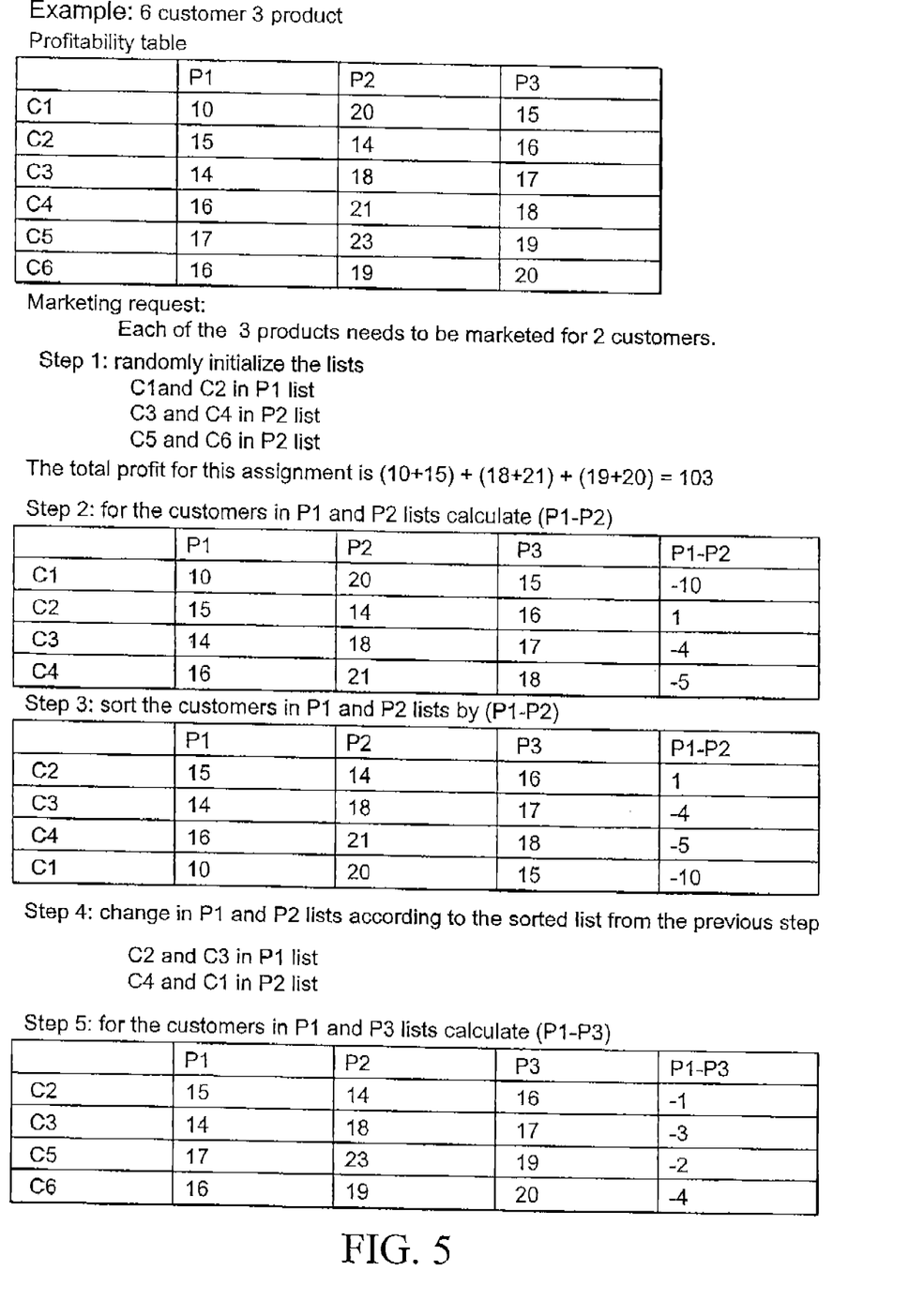
FIGS. 5 and 5A illustrates an alternate embodiment of an example of the optimization process in accordance with the teachings of one embodiment of the present invention.
Figure 5A:
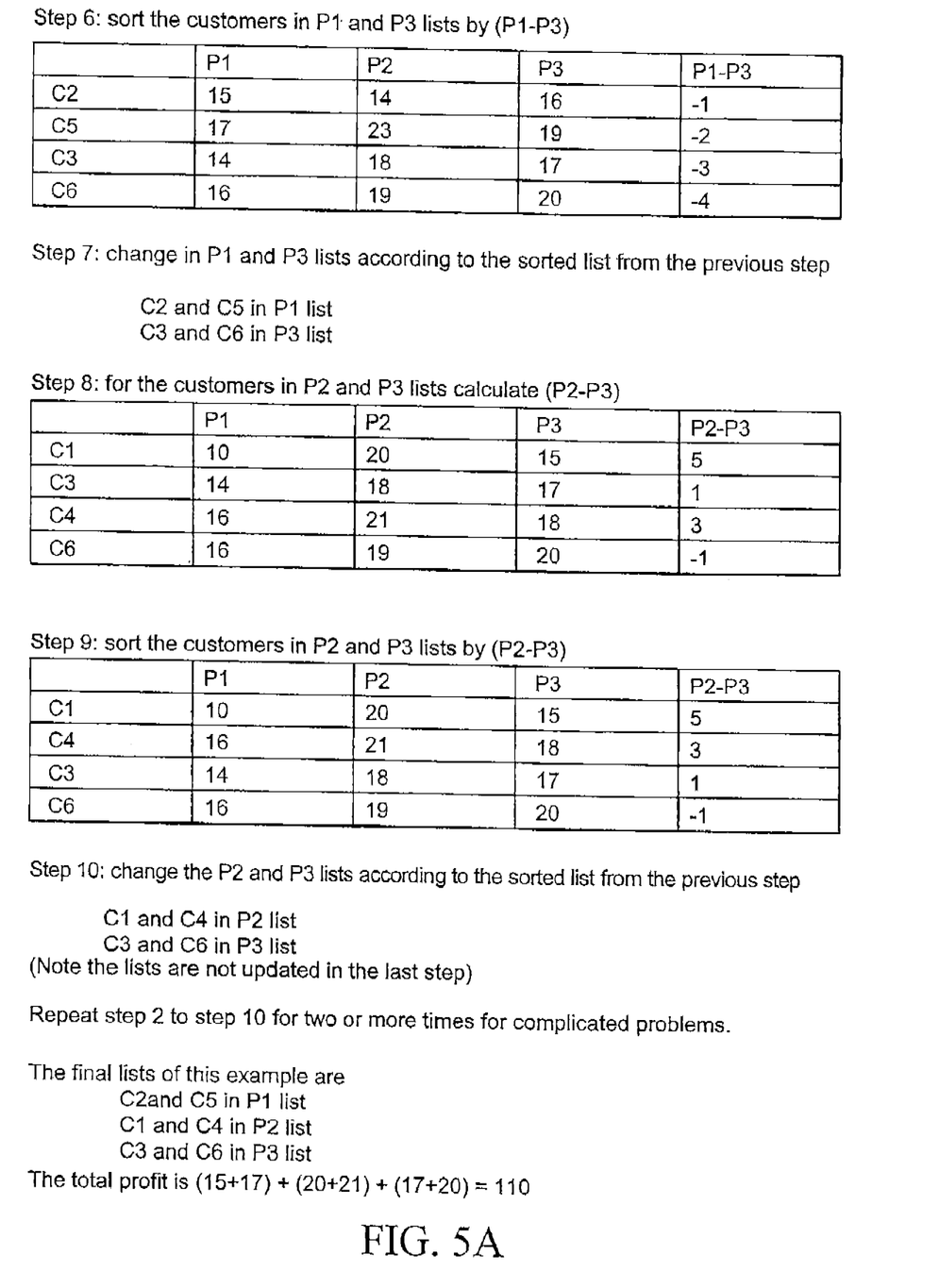

FIG. 5 illustrates a more pragmatic scenario or example wherein a collection of three different products are offered to six different customers, illustrating the optimization method disclosed above. The above method is best understood with reference to an actual example of the method in practical operation.

As illustrated in FIG. 5, three different products (P1, P2, and P3) are being offered to six different customers (C1, C2, C3, C4, C5, and C6) with the goal of maximizing the overall final total profit ($P_T$) for the particular product offering of products P1, P2, and P3. In the embodiment of FIG. 5, P1 is offered to two of the six customers, P2 is offered to another two of the six customers, and P3 is offered to the remaining two customers.

In accordance with Block 305, a random assignment is made of the $N^i$ customers to product i{i=1, 2, . . . , M}. Alternately, a 'greedy' algorithm may be invoked to assign the N customers to the M products. As such, the process is initialized by assigning one particular product offer to each customer. As mentioned, this can be done randomly or through the use of any other available algorithm.

Therefore, in the example of FIG. 5, a random assignment of the products P1, P2, and P3 is made, illustrated as Step1 in FIG. 5, wherein product 1 (P1) is chosen to be marketed to two customers of the six customers, product 2 (P2) is chosen to be marketed to another two of the six customers, and product 3 (P3) is chosen to be marketed to the remaining two customers from the overall total of six customers.

Accordingly, using a random product/customer assignment, product P1 is assigned to customers C1 and C2 product P2 is assigned to C3 and C4; and product P3 is assigned to C5 and C6. As a result, the total profit for this random assignment is (10+15)+(18+21)+(19+21)=103, as illustrated in Step 1 of FIG. 5.

Next, in accordance with Block 310, any two products (e.g., i{i=1, 2, . . . , M} and j{j≠i·j=1, 2, . . . , A}) from the offered products list are chosen, whereupon the respective expected profitabilities for each customer is determined.

Accordingly, in the example of FIG. 5, a total of three products are being offered to the customers C1 through C6. Accordingly, in one embodiment, the expected profitabilities for each customer is determined by analyzing two products at a time, in different product combinations, to determine the expected profitability (Px−Py) for each consumer. As such, in the example of FIG. 5, the expected profitability (Px−Py) for each consumer is determined by using two products at a time in different product combinations, as follows: (P1−P2), (P1−P3), and (P2−P3).

Accordingly, for the customers in the P1 and P2 lists, which are customers C1, C2, C3, and C4, the expected profitability (Px−Py) is determined in accordance with the following (P1−P2), which is illustrated as Step 2. As such, the expected profitability (P1−P2) for each customer is as follows: C1=P1−P2=10−20=−10 C2=P1−P2=15−14=1; C3=P1−P2=14−18=−4; and C4=P1−P2=16−21=−5.

In accordance with Block 315, the list of customers of both offered products is then sorted by the difference in these respective expected profitabilities (DEP). Therefore, as illustrated in Step 3 of FIG. 5, C2 is first on the list with an DEP of 1, followed by C3 with an DEP of −4, followed by C4 with an DEP of −5, followed by C1 with an DEP of −10 or (1, −4, −5, and 10).

In accordance with the difference in the respective expected profitabilities (DEP) customers C2 and C3 are placed in the P1 list and customers C4 and C1 are placed in the P2 list, illustrated as Step 4 in FIG. 5.

In accordance with Block 320, the process is repeated for the remaining two product combinations (e.g., remaining product combinations (P1−P3) and (P2−P3)) to increase the overall profitability of the marketing of the offered products.

As such, in accordance with Block 310, the next two product combination (e.g., (P1−P3)) from the offered product list is processed, whereupon the respective expected profitabilities for each customer is determined, which is illustrated as Step 5 in FIG. 5. Accordingly, for the customers in the P1 and P3 lists, which are customers C2, C3, C5 and C6, the expected profitability (Px−Py) is determined in accordance with the following (P1−P3). As such, the expected profitability (P1−P3) for each consumer is as follows: C2=P1−P3=15−16=−1; C3=P1−P3=14−17=−3; C5=P1−P3=17−19=−2; and C6=P1−P3=16−20=−4.

Similarly, in accordance with Block 315, the list of customers of both offered products is then sorted by the difference in these respective expected profitabilities (DEP). Therefore, as illustrated in Step 6, C2 is first on the list with an DEP of −1, followed by C5 with an DEP of −2, followed by C3 with an DEP of −3, followed by C6 with an DEP of −4 or (−1, −2, −3, and −4).

In accordance with the difference in the respective expected profitabilities (DEP), customers C2 and C5 are placed in the P1 list and customers C3 and C6 are placed in the P3 list, illustrated at Step 7.

Again, in accordance with Block 320, the process is repeated for the remaining two products combinations (e.g., remaining product combination (P2P3)) to increase the overall profitability of the offered products.

As such, in accordance with Block 310 the last two product combination (e.g., (P2−P3)) from the offered product list is processed, whereupon the respective expected profitabilities for each consumer is determined, which is illustrated as Step 8. Accordingly, for the customers in the P2 and P3 lists, which are customers C1, C3, C4 and C6, the expected profitability (Px−Py) is determined in accordance with the following (P2−P3). As such, the expected profitability (P2−P3) for each consumer is as follows: C1=P2−P3=20−15=5; C3=P2−P3=18−17=1; C4=P2−P3=21−18=3; and C6=P2−P3=19−20=−1.

In accordance with Block 315, the list of customers of both offered products is then sorted by the difference in these respective expected profitabilities (DEP). Therefore, as illustrated in Step 9, C1 is first on the list with an DEP of 5, followed by C4 with an DEP of 3, followed by C3 with an DEP of 1, followed by C6 with an DEP of −1 or (5, 3, 1, and −1).

In accordance with the difference in the respective expected profitabilities (DEP), customers C1 and C4 are placed in the P2 list and customers C3 and C6 are placed in the P3 list, illustrated at Step 10.

As a result, the three different two product combinations provide the following customer/product matches:

| | |
|---|---|
| For Product Combination | C2 and C3 in P1 List = 15 + 14 = 29 |
| P1 and P2 | C4 and C1 in P2 List = 21 + 20 = 41 |
| For Product Combination | C2 and C5 in P1 List = 15 + 17 = 32 |
| P1 and P3 | C3 and C6 in P3 List = 17 + 20 = 37 |
| For Product Combination | C1 and C4 in P2 List = 20 + 21 = 41 |
| P2 and P3 | C3 and C6 in P3 List = 17 + 20 = 37 |

As such, product P1 has a first profit amount of 29 (15+14) from the first combination of consumers C2 and C3 and a second profit amount of 32 (15+17) from the second combination of consumers C2 and C3. Product P2 has a first profit amount of 41 (21+20) from the first combination of consumers C4 and C1 and a second identical profit amount of 41 (21+20) from the second combination of identical consumers C1 and C4. Product P3 has a first profit amount of 37 (17+20) from the first combination of consumers C3 and C6 and a second identical profit amount of 37 (17+20) from the second combination of identical consumers C3 and C6.

Accordingly, in one embodiment, the first profit associated with a particular product is overwritten by subsequent profit amounts associated with that same product (e.g., in the example of FIG. 5, the first profit amount is overwritten by the second profit amount associated with the same product) when determining the final profit amount for that product. In an alternate embodiment, the different profit amounts associated with each corresponding product may simply be compared to each other to determine the maximum profit for that particular product.

In the example of FIG. 5, the first profit associated with each product is overwritten by the subsequent profit associated with the same product. As such, the first profit amount of 29 (15+14) for product P1 is overwritten by the second profit amount of 32 (15+17) for product P1; the first profit amount of 41 (21+20) for product P2 is overwritten by the second profit amount of 41 (21+20) for product P2; and the first profit amount of 37 (17+20) for product P3 is overwritten by the second profit amount of 37 (17+20) for product P3. As a result, the final profit for product P1 is 32 (15+17), the final profit for product P2 is 41 (21+20), and the final profit for product P3 is 37 (17+20).

Accordingly, the final total profit ($P_T$) for the three different products (P1, P2, and P3), which are being offered to six different customers (C1, C2, C3, C4, C5, and C6), comprises the sum of the final profits associated with the respective products. As such, the final total profit ($P_T$) may be expressed as $P_T$=Final Profit [P1]+Final Profit [P2]+Final Profit [P3]=(15+17)+(21+20)+(17+20)=32+41+32=110.

As can be easily observed, the final total profit ($P_T$)=(15+17)+(21+20)+(17+20)=32+41+32=110, employing the above described optimization method, is greater then the total profit obtained through the initial random assignment of products (e.g., (10+15)+(18+21)+(19+21)=103).

As mentioned above, at Block 325, Block 310 through Block 320 may be repeated if necessary. Likewise, as mentioned above, it is generally sufficient to repeat Block 310 through Block 320 three times for optimization purposes.

For instance, using the example of FIG. 5, at the end of Step1 we have a total profit, say TP1 (e.g., the total profit of the random assignment in FIG. 5 results in a total profit of 103) and at the end of Step 10 we have an updated final total profit, say TP2 (e.g., the final total profit using the optimization method, as illustrated in FIG. 5 results in a final total profit ($P_T$) of 110). Accordingly, in one embodiment, the expression (TP2−TP1)/TP1 may be used to determine if Step 2 through Step 10 should be repeated, which correspond to Block 310 through Block 320.

Generally, Step 2 through Step 10 (e.g., Block 310 through Block 320) are typically repeated in situations involving three or more products being offered to multiple customers.

In one embodiment, Step 2 through Step 10 (e.g., Block 310 through Block 320) are repeated when the following expression is satisfied: TP2−TP1)/TP1>specified value SV), in one embodiment the specified value (SV) is 0.01. After we have repeated Step 2 to Step 10 (e.g., Block 310 through Block 320), we will have a new final total profit, say TP3. Accordingly, the expression (TP3−TP2)/TP2 may be used to see if Step 2 to Step 10 (e.g., Block 310 through Block 320) should be repeated once again.

Although the teachings of the present invention are illustrated as embodied in the context of a customer/product profit optimization process, the present invention is not intended to be limited to such contexts. Rather the teachings disclosed in the present invention could be applied to a variety of data processing scenarios wherein optimization of different data types is desired.

Figure 6:
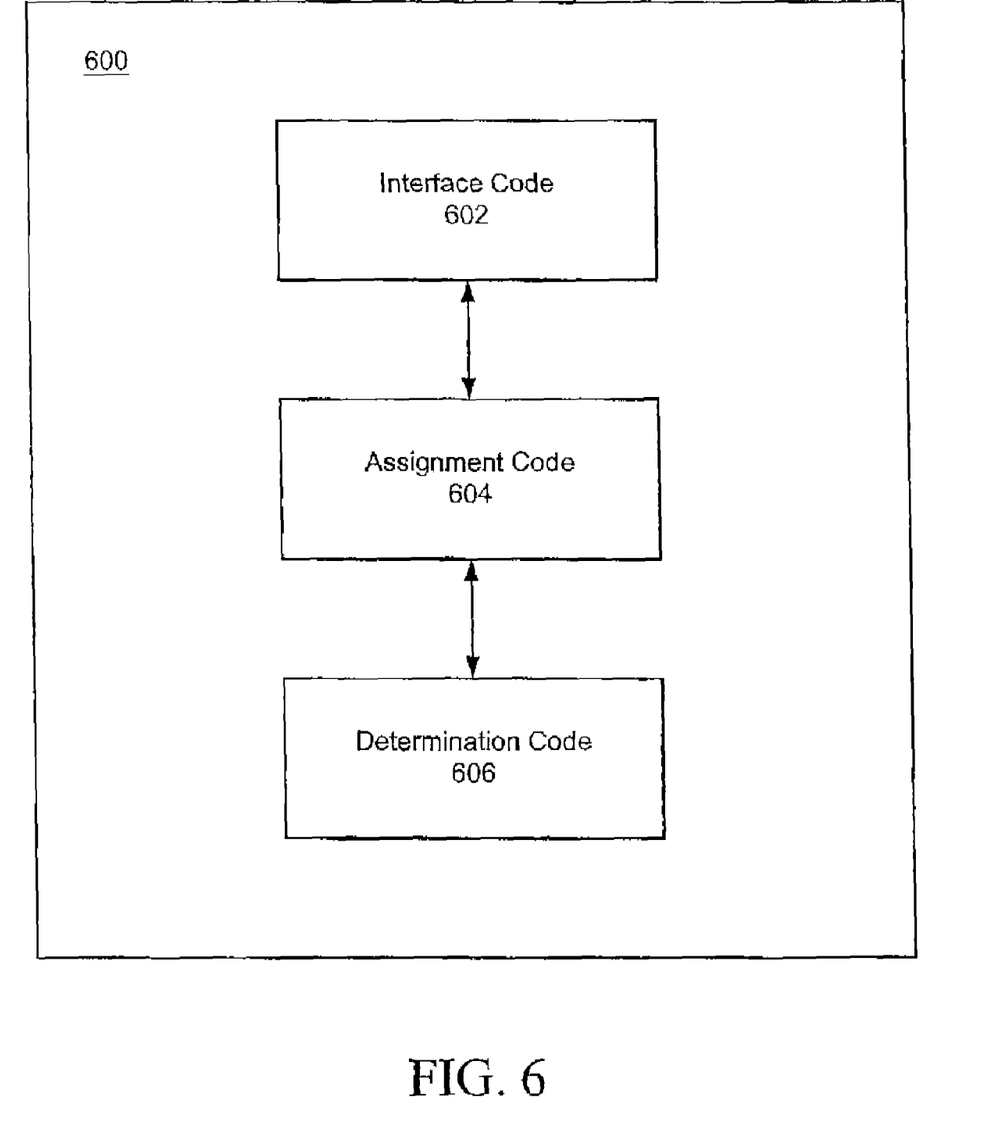
FIG. 6 illustrates an embodiment of a machine-readable medium 600, suitable for use with a computer/network environment, in accordance with the teachings of one embodiment of the present invention.

FIG. 6 illustrates an embodiment of a machine-readable medium 600 containing various sets of instructions, code sequences, configuration information, and other data used by a computer or other machine processing device. The embodiment of the machine-readable medium 600, illustrated in FIG. 6, is suitable for use with the computer/network environment described above. The various information stored on medium 600 is used to perform various data processing operations. Machine-readable medium 600 is also referred to as a computer-readable or processor-readable medium. Machine-readable medium 600 can be any type of magnetic, optical, or electrical storage medium including a diskette, magnetic tape, CD-ROM, memory device, or other storage medium or carrier-wave signal.

Machine-readable medium 600 includes interface code 602 that controls the flow of information between various devices or components within the computer/network environment. Interface code 602 may control the transfer of information within a device, or between an input/output port and a storage device. Additionally, interface code 602 may control the transfer of information from one device to another.

Machine-readable medium 600 also includes assignment code 604 to perform a random assignment of the $N^i$ customers to product i{i=1, 2, . . . , M}. Alternately, a 'greedy' algorithm may be invoked by interface code 604 to assign the N customers to the M products. As such, the process is initialized by assigning one particular product or product offer to each customer. As mentioned, this can be done randomly or through the use of any other available algorithm. In one embodiment, the single product models are used to initialize the process by assigning the top decile consumers to that product for each model, removing multiple entries, and continuing through the lower deciles until each customer has an assignment. The complete process is generally insensitive to this initialization process.

Next, the assignment code 604 is configured to chose any two products (e.g., i{i=1, 2, . . . , M} and j{j≠i·j=1, 2, . . . , M}) from the offered products list, whereupon the respective expected profitabilities for each consumer is determined.

Accordingly, determination code 606 analyzes the list of customers of both offered products, wherein the list of customers of both offered products is sorted by the difference in these respective expected profitabilities by the determination code 606. In one embodiment, the consumers or candidates k{k=1, 2, . . . , $(N^i+N^j)$} are sorted according to p (i, k)-p (j, k), which is the difference in respective expected profitabilities, in decreasing order. Accordingly, $N^i$ customers are chosen from the top of the sorted list for product i and the remaining customers are chosen for product j. In an alternate embodiment, the consumers or candidates k{k=1, 2, . . . , $(N^i+N^j)$} are sorted according to p(i, k)-p(i, k), which is the difference in respective expected profitabilities, in increasing order. Accordingly, in one selected embodiment, $N^i$ customers are chosen from the bottom of the sorted list for product i and the remaining customers are chosen for product j. It is understood that in some instances, a customer product offer for a particular customer may be exchanged when the overall profitability can be increased by the exchange.

Accordingly, the determination code 606 repeats the analysis for each two-product combination to increase the overall profitability. In one embodiment, the first profit associated with a particular product is overwritten by subsequent profit amounts associated with that same product by determination code 606 when determining the final profit amount. In an alternate embodiment, the different profits associated with each corresponding product may simply be compared to each other by determination code 606 to determine the maximum profit for that particular product.

Determination code 606 then calculates the final total profit ($P_T$) for the different products (P1, P2, . . . , Px), which are being offered to the different customers (C1, C2, . . . , Cx), by summing the final resulting profits associated with the respective products to provide the final total profit ($P_T$). As such, the final total profit ($P_T$) may be expressed as $P_T$=Final Profit [P1]+Final Profit [P2]+ . . . +Final Profit [Px].

Determination code 606 is configured to repeat the assignment, analysis, and final total profit calculations ($P_T$), provided the determination code 606 concludes that such a repetition is necessary during the optimization process. In one embodiment, it is typically sufficient to repeat the process three times for optimization purposes. In an alternate embodiment, the expression (TPx-TPy)/TPx>specified value (SV), in one embodiment the specified value (SV) is 0.01, wherein TPx and TPy represent respective total profits obtained at different stages of the process, is used to determine whether to repeat select steps of the optimization process.

As such, the machine-readable medium 600 is configured to operate in accordance with the concepts of the above illustrated optimization process. As such, the machine-readable medium 600 is configured to execute the operational steps of the optimization process, as illustrated and discussed above in description.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A market selection optimization method, the method comprising the computer implemented steps of:
    (a) assigning product offers to consumers such that each consumer is assigned at least one product offer from a combination of two product offers, wherein a first product offer is made to a first group of consumers and a second product offer is made to a second group of consumers resulting in an assignment pattern;
    (b) determining a difference in expected profitabilty associated with the assigned product offers for each consumer;
    (c) sorting the consumers according to the respective difference in expected profitabilities; and
    (d) reassigning the product offers to the sorted consumers in accordance with the assignment pattern and offering the reassigned products to the sorted customers;
    wherein steps (a) through (d) are executed for each possible two product offer combination;
    wherein previously reassigned product offers associated with the sorted consumers are overwritten by new product offer values for common product offers associated with a consumer as each subsequent two product combination is processed; and
    wherein the previously reassigned product offers associated with the sorted consumers have a total profit value TPx and the new product offer values associated with the sorted consumers have a total profit value TPy.

2. The method of claim 1, wherein a difference of the total profit value TPy and the total profit value TPx divided by the total profit value TPx results in a determination value, provided the determination value is greater than a specified value then the steps (a) through (d) are re-executed for each possible two product offer combination.

3. A machine readable medium containing executable instructions which, when executed in a processing system, causes the processing system to perform the steps of a method for market selection optimization, the method comprising:
    (a) assigning product offers to consumers such that each consumer is assigned at least one product offer from a combination of two product offers, wherein a first product offer is made to a first group of consumers and a second product offer is made to a second group of consumers resulting in an assignment pattern;
    (b) determining a difference in expected profitability associated with the assigned product offers for each consumer;
    (c) sorting the consumers according to the respective difference in expected profitabilities; and
    (d) reassigning the product offers to the sorted consumers in accordance with the assignment pattern and offering the reassigned products to the sorted customers;
    wherein steps (a) through (d) are executed for each possible two product offer combination;
    wherein previously reassigned product offers associated with the sorted consumers are overwritten by new product offer values for common product offers associated with a consumer as each subsequent two product combination is processed; and
    wherein the previously reassigned product offers associated with the sorted consumers have a total profit value TPx and the new product offer values associated with the sorted consumers have a total profit value TPy.

4. The medium of claim 3, wherein a difference of the total profit value TPy and the total profit value TPx divided by the total profit value TPx results in a determination value, provided the determination value is greater than a specified value then the steps (a) through (d) are re-executed for each possible two product offer combination.

5. A market selection optimization method, the method comprising the computer implemented steps of:
(a) assigning product offers to consumers such that each consumer is assigned at least one product offer from a combination of two product offers, wherein a first product offer is made to a first group of consumers and a second product offer is made to a second group of consumers resulting in an assignment pattern;
(b) determining a difference in expected profitabilty associated with the assigned product offers for each consumer;
(c) sorting the consumers according to the respective difference in expected profitabilities; and
(d) reassigning the product offers to the sorted consumers in accordance with the assignment pattern and offering the reassigned products to the sorted customers;
wherein steps (a) through (d) are executed for each possible tow product offer combination;
wherein previously reassigned product offers associated with the sorted consumers are overwritten by new product offer values for common product offers associated with a consumer as each subsequent two product combination is processed; and
wherein the previously reassigned product offers associated with the sorted consumers have a total profit value TPx and the new product offer values associated with the sorted consumers have a total profit value TPy.

6. The method of claim 5, wherein a difference of the total profit value TPy and the total profit value TPx divided by the total profit value TPx results in a determination value, provided the determination value is greater than a specified value then the steps (a) through (d) are re-executed for each possible two product offer combination.

\* \* \* \* \*